United States Patent [19]

Gläser

[11] 4,391,453
[45] Jul. 5, 1983

[54] CHILD STROLLER

[75] Inventor: Dieter Gläser, Dachau, Fed. Rep. of Germany

[73] Assignee: PEG Perego-Pines Deutschland GmbH, Dachau, Fed. Rep. of Germany

[21] Appl. No.: 192,920

[22] Filed: Oct. 1, 1980

[30] Foreign Application Priority Data

Oct. 4, 1979 [DE] Fed. Rep. of Germany ....... 2940302
Apr. 16, 1980 [DE] Fed. Rep. of Germany ....... 3014674

[51] Int. Cl.³ .............................................. B62B 9/10
[52] U.S. Cl. ................................... 280/47.4; 280/642; 297/311; 297/353; 297/429
[58] Field of Search .................. 280/47.4, 47.38, 47.39, 280/47.41, 647–650, 657, 658, 35, 47.13 R, 47.17–47.19, 47.2, 47.24, 47.27–47.29, 47.37 R, 47.37 C, 47.37 L; 297/311, 317, 353, 118, 256, 429

[56] References Cited

U.S. PATENT DOCUMENTS

| 518,097 | 4/1894 | Derby | 297/353 X |
| 531,330 | 12/1894 | Potter | 280/47.4 X |
| 1,113,328 | 10/1914 | Goggin | 280/47.38 X |
| 1,123,872 | 1/1915 | Hazelton | 280/47.4 |
| 1,205,802 | 11/1916 | Silbert | 297/353 X |
| 1,358,273 | 11/1920 | Wolford | 297/353 |
| 2,310,366 | 2/1943 | Harman | 297/353 X |
| 2,783,053 | 2/1957 | Sheldrick et al. | 280/47.4 X |
| 3,248,125 | 4/1966 | Gill | 280/47.4 |
| 4,221,430 | 9/1980 | Frobose | 297/353 |

FOREIGN PATENT DOCUMENTS

| 137295 | 4/1934 | Austria | 280/47.38 |
| 192136 | 10/1907 | Fed. Rep. of Germany | 297/118 |
| 1005633 | 4/1952 | France | 297/317 |

Primary Examiner—Joseph F. Peters, Jr.
Assistant Examiner—Mitchell J. Hill
Attorney, Agent, or Firm—Hubbard, Thurman, Turner & Tucker

[57] ABSTRACT

A child stroller has a back and a leg rest pivotally coupled to a seat so that the angles between the seat and leg rest or back can be changed. The seat can be slidably moved relative to the back to provide an adjustable length seating surface. The height of the back and length of the leg rest are both adjustable. The seat, back and leg rest are locked into position after the desired adjustments are made.

25 Claims, 9 Drawing Figures

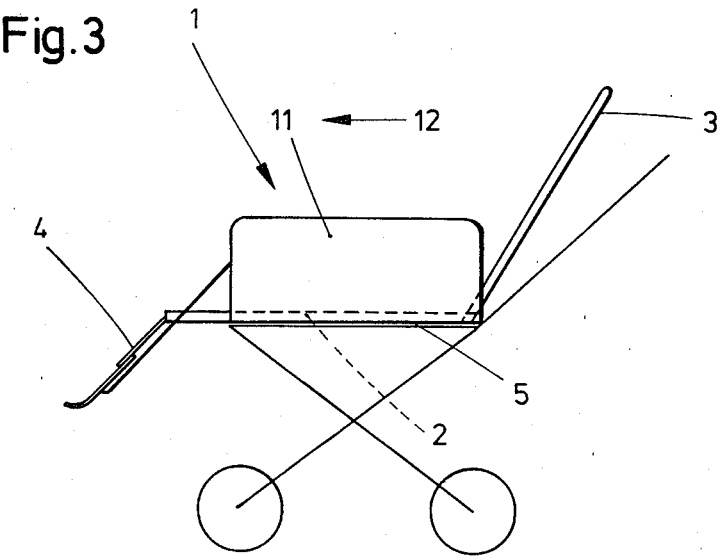
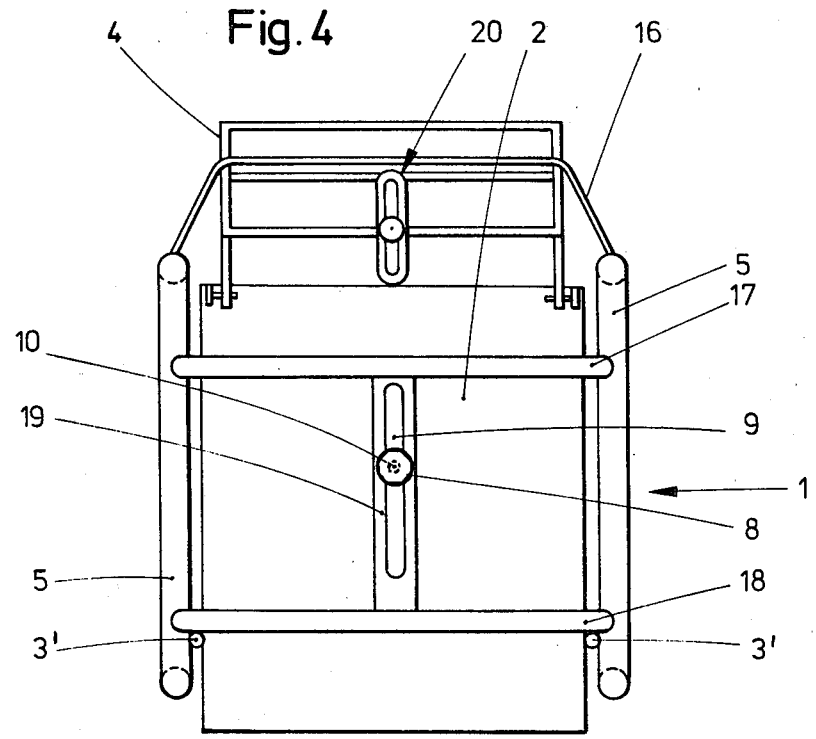

CHILD STROLLER

BACKGROUND AND SUMMARY OF THE INVENTION

This invention refers to a child carriage, and more particularly concerns a child stroller having a frame, a seat, a back rest and a footrest.

A conventional stroller consists of a frame having a seat and being equipped with a back rest and a footrest. This conventional stroller has the disadvantage that infants which can just barely set are forced into a seating posture, which is anatomically dangerous and can lead to damaged posture. Since the seat is too big for such a child, the child is either made to sit upright on the rear part of the seat while leaning against the back rest with stretchedout legs, or the child is seated on the front part of the seat in such a way that his legs can hang down onto the footrest. In the second situation, it is necessary to stuff the free space between the child's back and the back rest with pillows or blankets. The child, however, will not remain tranquilly seated in either seating position and after a while will assume a more or less crooked seating position.

The conventional stroller is likewise unfavourable for children who are just at the stage in which they grow out of the stroller, since they constantly assume a sitting position in which they either always have their legs forming an angle with the seat, or, if their legs do not form an angle, they find only a short support surface for the thighs, with the rim of the seat pressing into the thighs and thus disrupting the blood circulation of the legs.

The present invention is concerned with the task of providing a child stroller having a seat configuration which can be adjusted to the size of any child of stroller age, particularly to the length of the thighs of each child.

According to the invention, the seat includes at least one seating surface member which can be moved relative to the frame for adaptation to the length of a child's thigh and which can be locked in position. By making this adjustment, the seating surface of the seat can be varied in such a way that small children just barely able to sit, as well as children who are starting to outgrow the stroller, are always seated correctly from the anatomical viewpoint, i.e. for each child in the above-mentioned size range, the length of the seat can be adjusted so as to ensure an optimum support for the child's thigh.

An advantageous embodiment is considered to be in the fact that each seating surface part is being guided in at least one guideway arranged on the frame. It is thereby possible to move each seating surface part, without tilting, in a simple and easy manner.

A favorable embodiment from the construction viewpoint can be given by the fact that at least one elongated slot oriented in the direction of travel is arranged as the guideway on the frame. This design can be manufatured especially easily and is therefore very favorable costwise.

In order to prevent a child who is climbing around in the stroller from accidentally causing the seat to be moved, it is advantageous for each seating surface part to be capable of being locked in position by means of a locking device. It is also advantageous for the locking device to be formed by at least one threaded pin being arranged on each seating surface part and projecting through at least one elongated slot, and a wing nut or hand nut capable of being screwed on the threaded pin and producing a fixed connection between the seating surface and the frame. By means of such a locking device, it is possible to securely lock into place the length of the seating surface once it has been selected.

It is also advantageous for the back rest to be coupled to the frame so that it can be tilted.

An advantageous embodiment is given due to the fact that the seat exhibits a single seating surface part and that the frame and the guideway are designed in such a way that the seating surface part can be moved in the direction of seating from a position of smallest length—which corresponds to the average length of the thigh of a child of earliest sitting age—to a position of greatest length—which corresponds to the average length of the thigh of a child on the verge of outgrowing a stroller.

A favorable alternative embodiment can be considered to lie in the fact that the seat exhibits several seating surface parts which can be attached to the frame transversely with respect to the direction of seating, in an individually detachable manner, and that for adaptation to a given thigh length of a child the seating parts can be moved in the direction of seating, relative to the frame, and the number of seating parts employed can be changed, if necessary.

An advantageous embodiment from the construction viewpoint is given due to the fact that in its lower region the back rest overlaps the sole seating surface part, or the rearmost of several seating surface parts, on both sides. By means of this expedient, it is ensured that a gap is not formed in the rear region of the seat.

According to a further development of the invention, for the purpose of adaptation to the length of a child's back, the back rest is movably coupled to the seat and can be locked in position. Due to this expedient, the back rest can be pulled out to a desired height and locked into position. If the kiddie stroller is to be used for a smaller child, then the back rest is disengaged and adjusted to the new, smaller height.

An advantageous embodiment is given due to the fact that the footrest is designed so that its length can be adjusted. By means of this, it is possible to adapt the footrest to the length of a child's lower leg, thus ensuring optimum support of the lower limbs.

In doing so, it can be advantageous for the footrests to be coupled to the frame so that they can be adjusted to various positions of inclination in a conventional manner.

An alternative embodiment on this matter provides for the footrest to be arranged on the sole seating surface part or on the front seating surface part in a manner so that it can be adjusted to different positions of inclination. By this expedient, a complete support of the child's legs can likewise be achieved.

An advantageous design refinement is achieved by coupling side plates to the frame in a conventional manner in order to form a frame unit, and by securing the frame unit in a detachable manner to a wheel frame, for instance a "scissors-type" frame.

BRIEF DESCRIPTION OF THE DRAWINGS

A preferred embodiment of the invention is described below with the help of the drawings as follows:

FIG. 3 shows a side view of the stroller of FIG. 1 with the seating surface part having been moved forwards;

FIG. 4 shows a bottom view of the stroller of FIG. 1;

DETAILED DESCRIPTION

Figure 1:
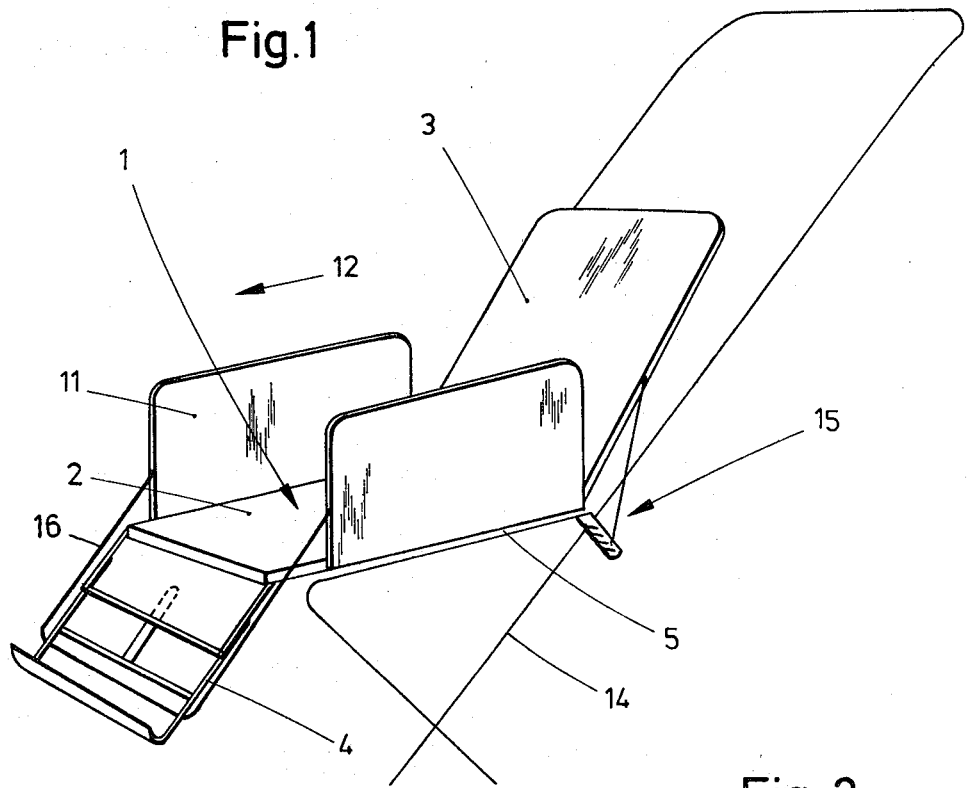
FIG. 1 shows a perspective view of a child stroller.

The child stroller shown in FIG. 1 exhibits a seat 1 with a frame 5. A back rest 3 is pivotally coupled to the frame and this back rest 3 can be brought into different positions of inclination by means of a setting mechanism 15. The seat 1 exhibits a seating surface member 2 to whose front edge the footrest 4—which can be brought into various positions of inclination by means of an additional setting mechanish 16—is pivotally coupled. Side walls 11 are arranged on the frame 5 in such a way that they extend upwards on both sides of seating surface 2. Arrow 12 indicates the direction of seating. The frame unit having thus been formed is coupled to a wheel frame in detachable manner. The wheel frame has been presented schematically in the drawing as a "scissors-type" frame 14. The frame unit can also be attached to the wheel frame in such a way that the seating direction 12 is directed exactly opposite; a child sitting in the kiddie stroller will then face the person pushing the stroller.

Figure 2:
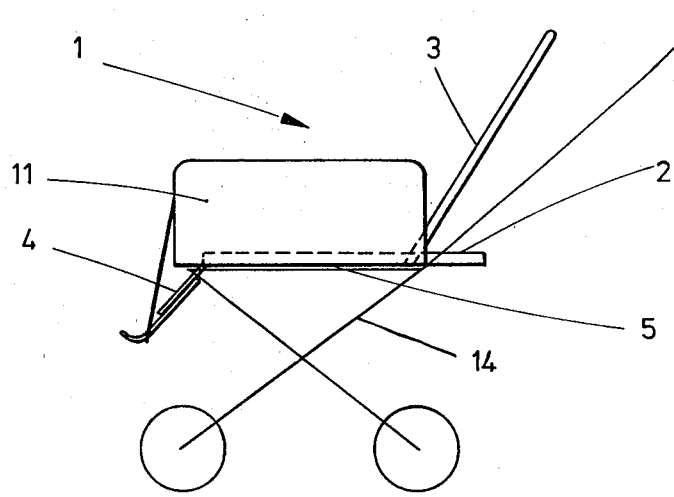
FIG. 2 shows a side view of the stroller of FIG. 1 with the seating surface part having been moved back.

The stroller of which a side view is shown in FIG. 2 exhibits a seat with a single seating member 2. In this figure, this seating part has been moved rearward, so that a portion of it projects in the rear below back rest 3. Thus the seat exhibits a small seating surface, so that a correspondingly small child enjoys complete leg support, with the footrest being simultaneously adaptable to the child as to the required length and the desired inclination.

In FIG. 3, seating surface member 2 has been moved forward in the direction of seating until its entire length forms the seating surface. This position of the seating surface 2, as well as the position of the pulled-out footrest 4, corresponds to the average length of the thigh of a child who is on the verge of outgrowing the stroller.

FIG. 4 shows a bottom view of the seat with a single seating surface. Seating surface 2 rest on two cross-ties 17 and 18. The cross-ties 17 and 18 are connected to one another by means of longitudinal tie 19. An elongated slot 9 has been formed in the longitudinal tie 19. This elongated slot 9 serves on one hand for the guidance of the seating surface part and on the other hand for securing it in place. On its bottom side, seating surface member 2 exhibits a threaded pin 10 which projects into the elongated slot and onto which a wing nut or hand nut 8 can be screwed. In this embodiment, the footrest 4 has been fastened to the front edge of seating surface member 2. Via adjusting device 16, footrest 4 can be brought into various positions of inclination and, after a locking mechanism 20 has been released, it can be adjusted to a desired length. Back rest 3 is pivotally coupled to frame 5 by means of lower tube ends 3' and laterally overlaps the seating surface member 2.

If an infant who is just barely able to sit up is to be seated in the stroller, then the hand nut 8 is loosened and the seating surface member 2 is moved rearward in the direction of the back rest until the seating surface has reached a length at which, on one hand, the child can comfortably lean against the back rest and, on the other hand, an optimum support is available for the child's thighs. For this purpose, the length and the inclination of footrest 4 can be adjusted in such a way that the child can assume a comfortable seating posture. When the optimum position of the seating surface has been found, the seating surface 2 is secured again by screwing the hand nut 8 tightly onto the threaded pin.

If a bigger child is to use the stroller, then the hand nut 8 is loosened and the seating surface member 2 is shoved forward to such an extent and also the footrest 4 is changed in such a way that on the whole an optimum seating posture is now again obtained for the bigger child in this case.

Figure 5:
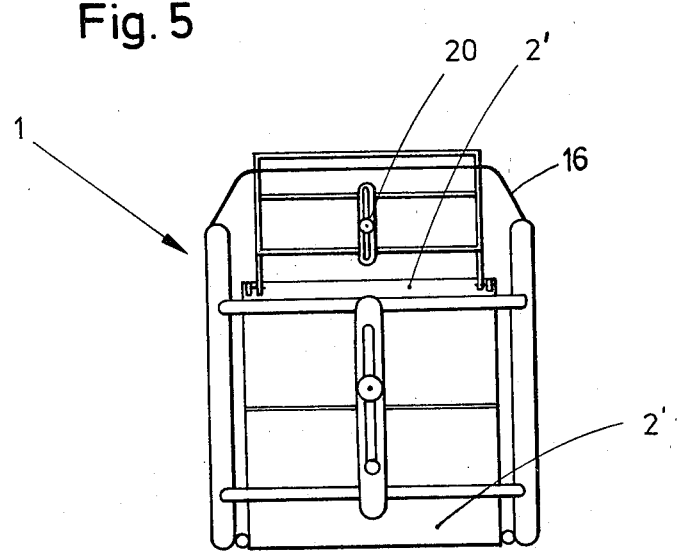
FIG. 5 shows a bottom view of an alternative embodiment of the seat of the stroller of FIG. 1.
Figure 6:
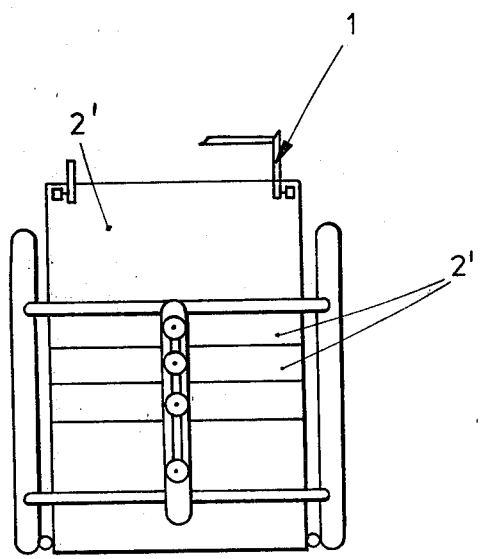
FIG. 6 shows the seat of FIG. 5 with additionally inserted seating surface parts.

FIGS. 5 and 6 show an alternative embodiment of the seat 1. In this embodiment, seat 1 exhibits several seating surface elements 2' which are being guided and locked into position in the same manner as in the case of the example of embodiment in FIG. 4. In FIG. 5 two seating surface elements 2' are shown, which form the smallest seating surface of the seat. The rear seating surface element is mounted in a fixed manner. In order to increase the size of the seating surface, the front seating surface element 2' is loosened and shoved forward. Depending on need, one or two additional seating surface elements are then inserted in the gap being formed and locked into position in the same manner as the other seating surface elements. In order to achieve an accurate an adaptation as possible, the width of the seating surface elements to be inserted is kept small.

The single seating surface member of FIGS. 2 to 4 can in the rear zone also be designed in such a way that the portion projecting behind the back rest can be folded downwards. In the design of the seat according to FIGS. 5 and 6, all seating surface elements 2' can also be designed to be of equal size.

Figure 7:
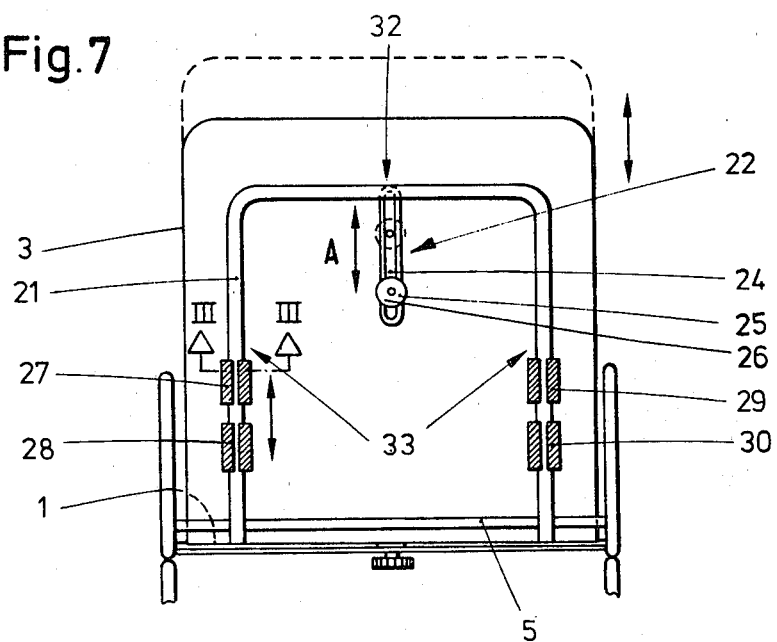
FIG. 7 shows a rear view of a part of a stroller with a back rest.
Figure 9:
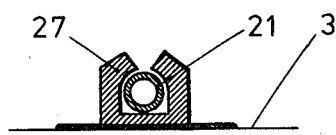
FIG. 9 shows a cross section of a plastic cam guideway along line III—III of FIG. 7.

In FIG. 7 a rear view of the upper portion of a child stroller is shown. The back rest 3 is guided in a movable manner on a back rest frame 21—which is pivotally coupled to the frame so that it can be tilted—and can be locked in position on same. Plastic cam guideways 27 to 30 serve as the guideways. These platic cam guideways 27 to 30 have been attached to the back rest and in each respective case accommodate a vertically proceeding segment of the back rest frame consisting of steel tubing. FIG. 9 shows a cross section of such a plastic cam guideway, allowing it to be recognized that the cams partly encircle the steel tubing. The plastic cam guideways 27 to 30 have been manufactured of slidable, elastic plastic material and can easily be pressed onto the steel tubing.

In addition, the back rest 3 is guided by means of a rail-type guideway 22 which is arranged on a horizontally proceeding segment 32 of back rest frame 21 and for instance is designed as a steel-wire bow, and the back rest 3 can be secured on same. A guide part 25 which is attached to back rest 3 and designed as a slide pin has been passed through a guide groove 24 and can be secured by means of a fastening member 26. The fastening member 26 is designed as a hand nut which can be screwed onto a thread having been cut on the free end of the slide pin. The guideway has been attached in the center of horizontally proceeding segment 32 of back rest frame 21 and extends downwards in the direction of movement A of back rest 3.

A modification of guideway 22 which has not been shown provides for the fastening member 26 to be fastened to the back rest frame in a rotatable manner and to engage a rail-type guideway formed in the back rest and secure the back rest.

Figure 8:
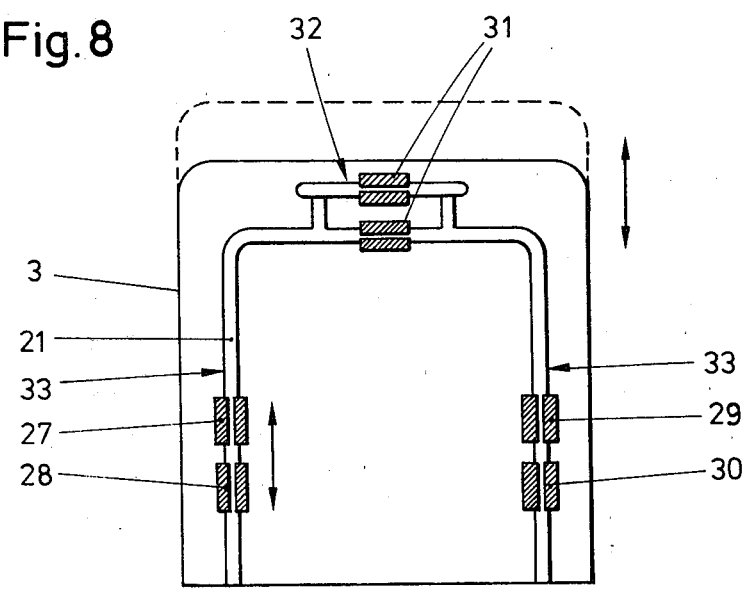
FIG. 8 shows a rear view of an alternative embodiment of a back rest.

FIG. 8 shows an alternative embodiment of back rest 3. In this form of embodiment as well, plastic cam guideways 27 to 30 have been arranged in the manner having been described. Several mounting supports 31 having been designed as plastic clamps have been arranged above one another on back rest 3 in such a way that they are located within the zone of a horizontally proceeding segment 32 of back rest 21. The plastic clamps are designed in such a way that they can easily be pressed onto the steel tubing of the back rest frame manually. The plastic clamps can exhibit the same construction as the plastic cam guideway shown in FIG. 9.

In the example of embodiment shown in FIG. 7, hand nut 26 is loosened and the back rest is pulled upward, if the length of the back rest is to be increased. When the desired length has been reached, the hand nut is tightened. Due to the fact that the back rest is being held at five points, an easy movability of the back rest on the back rest frame results, without the risk of tilting. If a smaller back rest height is desired, then the back rest is pushed downward after the hand nut has been loosened, and secured at the desired height.

In this embodiment, the movement is limited to the length of the guide groove of the guideway.

In an alternative embodiment, the adjustment of the back rest occurs by increments. The back rest—which is elastic and pliable—together with its mounting support 31 is pulled off from the back rest frame and by means of the next desired holder is fixed in place at the desired height on the back rest frame by pressing it on. The pressing on of the mounting support onto the steel tubing of the back rest frame does not present any difficulties, since the clamping holder has been manufactured of an elastic plastic material.

What is claimed is:

1. A child stroller having a frame (5), a seat (1) formed by at least one seating surface member (2, 2¹), a back rest (3), a footrest (4), supporting means (17, 18, 19) for disposing said one seating surface member on said frame relative to said back rest to support a child in a seated position, adjustment means (9) for moving said one seating surface member longitudinally relative to said back rest to provide a usable portion of said seat of variable length corresponding to the length of the child's thigh, and locking means (8, 10) for holding said one seating surface member in its adjusted position relative to said back rest.

2. A stroller according to claim 1 wherein said one seating surface member (2, 2') is disposed in at least one guideway (9) arranged on said frame (5).

3. A stroller according to claim 2, wherein said guideway on said frame (5) defines at least one elongated slot (9) oriented in the direction of travel of said one seating surface member along said guideway.

4. A stroller according to claim 1, further comprising a locking device (8, 10) coupled to said one seating surface member (2, 2').

5. A stroller according to claim 4, wherein said locking device (8, 10) comprises at least one threaded pin (10) coupled to said one seating surface member (2, 2') and projecting through an elongated slot (9); and means capable of being screwed on said threaded pin (10) for producing a fixed connection between said one seating surface member and said frame (5).

6. A stroller according to claim 1 wherein said back rest (3) is pivotally coupled to said frame (5), so that said back rest (3) can be tilted with respect to said one seating surface member.

7. A stroller according to claim 1 wherein said seat (1) comprises a single seating surface member (2) which can be moved in the direction of seating (12) from a position of smallest length to a position of greatest length.

8. A stroller according to claim 1 wherein said seat (1) comprises a plurality of seating surface member (2') arranged one behind the other in the direction of seating, said plurality of said seating surface members are individually removably attached to said frame and can be moved in the direction of seating (12) relative to said frame (5) for adaption to the given thigh length of a child.

9. A stroller according to claim 7 or 8 wherein said back rest (3) overlaps of rear portion of said one seating surface member (2, 2') on both sides.

10. A stroller according to claim 1 further comprising means for guiding said back rest (3) in a movable manner relative to said seat (1) and locking said back rest in position to adapt said stroller to the length of a child's back.

11. A stroller according to claim 10, wherein said guiding means comprises a back rest frame (21) to which said back rest (3) can be locked by means (22, 24, 25, 26) and adjusted in a direction so as to be in a predetermined position with respect to said back rest frame.

12. A stroller according to claim 11, wherein said guiding means further comprises a back rest frame (21) having a horizontal member; and a first guideway (22) which extends in the direction of adjustment (A).

13. A stroller according to claim 12, wherein said guideway (22) comprises a steel-wire bow which defines a guide groove (24).

14. A stroller according to claim 13, further comprising a guide member (25) fixedly coupled to said back rest (3); and fastening means (26) for securing said guide member along said guide groove (24).

15. A stroller according to claim 14, wherein said guide member (25) is a slide pin, and said fastening means comprises a hand nut which can screw onto the free end of said slide pin.

16. A stroller according to claim 11, wherein said guiding means comprises guideways (27 to 30) coupled to said back rest (3) and vertically extending segments of said back rest frame (21) to provide for vertical movement of said back rest relative to said back rest frame.

17. A stroller according to claim 11, wherein said back rest frame (21) is designed in the shape of a U and includes opposed legs coupled to said frame (5).

18. A stroller according to claim 11, wherein said back rest frame (21) comprises steel tubing.

19. A stroller according to claim 1 wherein said footrest (4) has an adjustable length.

20. A stroller according to claim 19, wherein said footrest (4) is pivotally coupled to said frame (5) so that it can be adjusted to various positions of inclination with respect to said seat (1).

21. A stroller according to claim 19, wherein said footrest (4) is pivotally coupled to a forward end of said one seating surface member (2, 2') so that it can be adjusted to various positions of inclination.

22. A stroller according to claim 1 further comprising side walls (11) coupled to said frame (5) forming a frame unit; and a wheel frame coupled to said frame unit.

23. A child stroller having a frame (5), a seat (1) including a seating surface member (2, 2'), a back rest (3), a footrest (4), support means (17, 18, 19) for disposing said seating surface member on said frame relative to said back rest to support a child in a seated position, adjustment means (9) for moving said seating surface member relative to said back rest to provide a usable portion of said seating surface member corresponding to the length of the child's thigh, locking means (8, 10) for holding said seating surface member in its adjusted position relative to said back rest, means for guiding said back rest in a movable manner relative to said seat and for locking said back rest in position to adapt said stroller to the length of the child's back, said guiding means comprising a back rest frame (21) to which said back rest can be locked in a predetermined position, and said guiding means comprises plastic cam guideways (27, 28, 29, 30) coupled to said back rest and vertically extending segments of said back rest frame to provide for vertical movement of said back rest relative to said back rest frame.

24. A child stroller having a frame (5), a seat (1) including a seating surface member (2, 2'), a back rest (3), a footrest (4), support means (17, 18, 19) for disposing said seating surface member on said frame relative to said back rest to support a child in a seated position, adjustment means (9) for moving said seating surface member relative to said back rest to provide a usable portion of said seating surface member corresponding to the length of the child's thigh, locking means (8, 10) for holding said seating surface member in its adjusted position relative to said back rest, means for guiding said back rest in a movable manner relative to said seat and for locking said back rest in position to adapt said stroller to the length of the child's back, said guiding means comprising a back rest frame (21) to which said back rest can be locked in a predetermined position, said back rest frame has a horizontal member, and said back rest includes a plurality of mounting supports (31) coupled to said back rest in vertical spaced relationship such that said back rest can be secured to said back rest frame at selected vertical positions of said back rest relative to said back rest frame.

25. A stroller according to claim 24, wherein said mounting supports (31) comprise elastic plastic clamps which can be manually pressed onto a segment of said back rest frame.

* * * * *